Dec. 5, 1967  J. E. FOREHAND  3,356,316
HINGED SPAR FLEXIBLE WING GLIDER
Filed Oct. 15, 1965  2 Sheets-Sheet 1
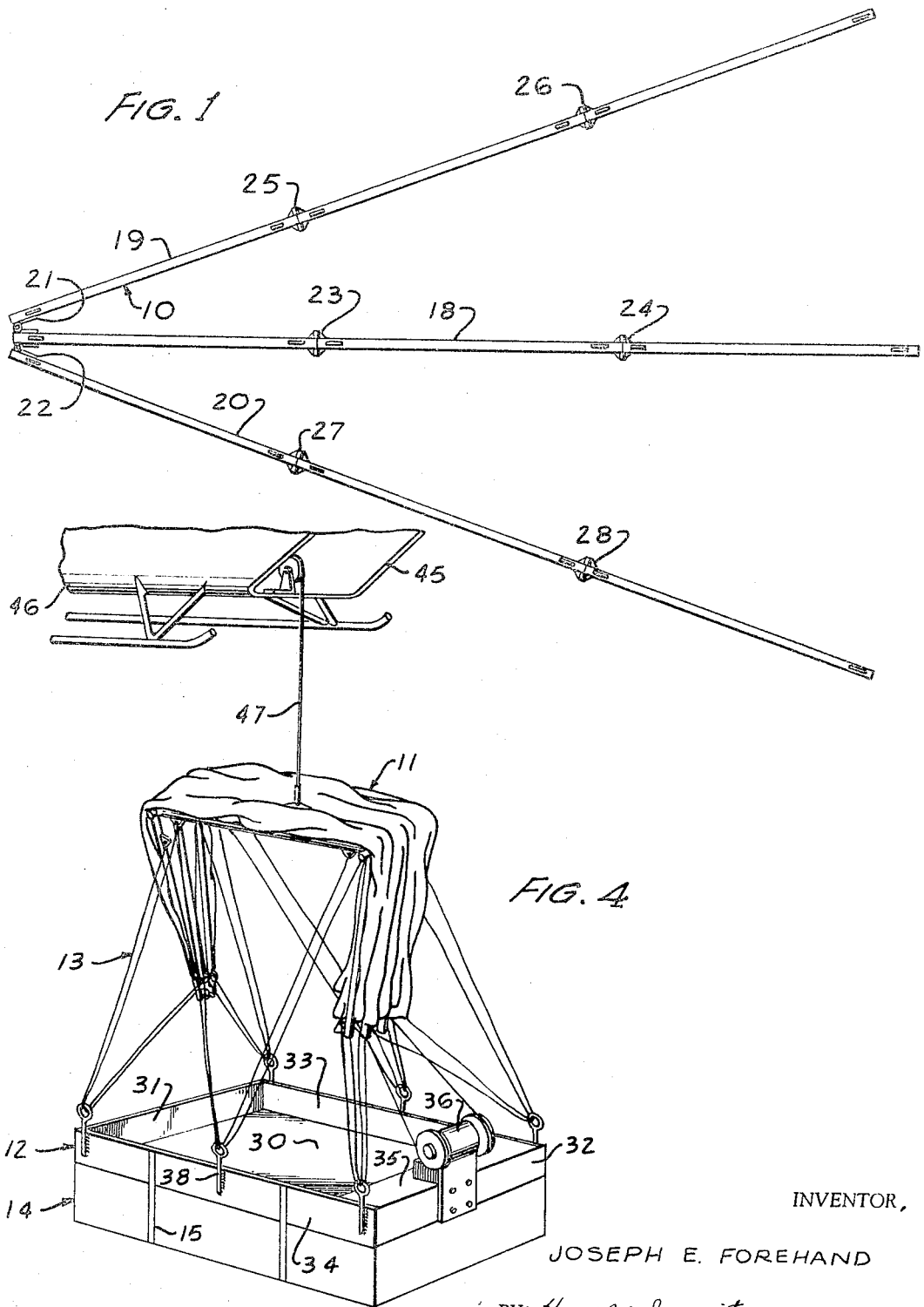
INVENTOR,
JOSEPH E. FOREHAND
BY: Harry M. Saragovitz,
Edward J. Kelly,
Herbert Berl &
James W. Colvin
ATTORNEYS.

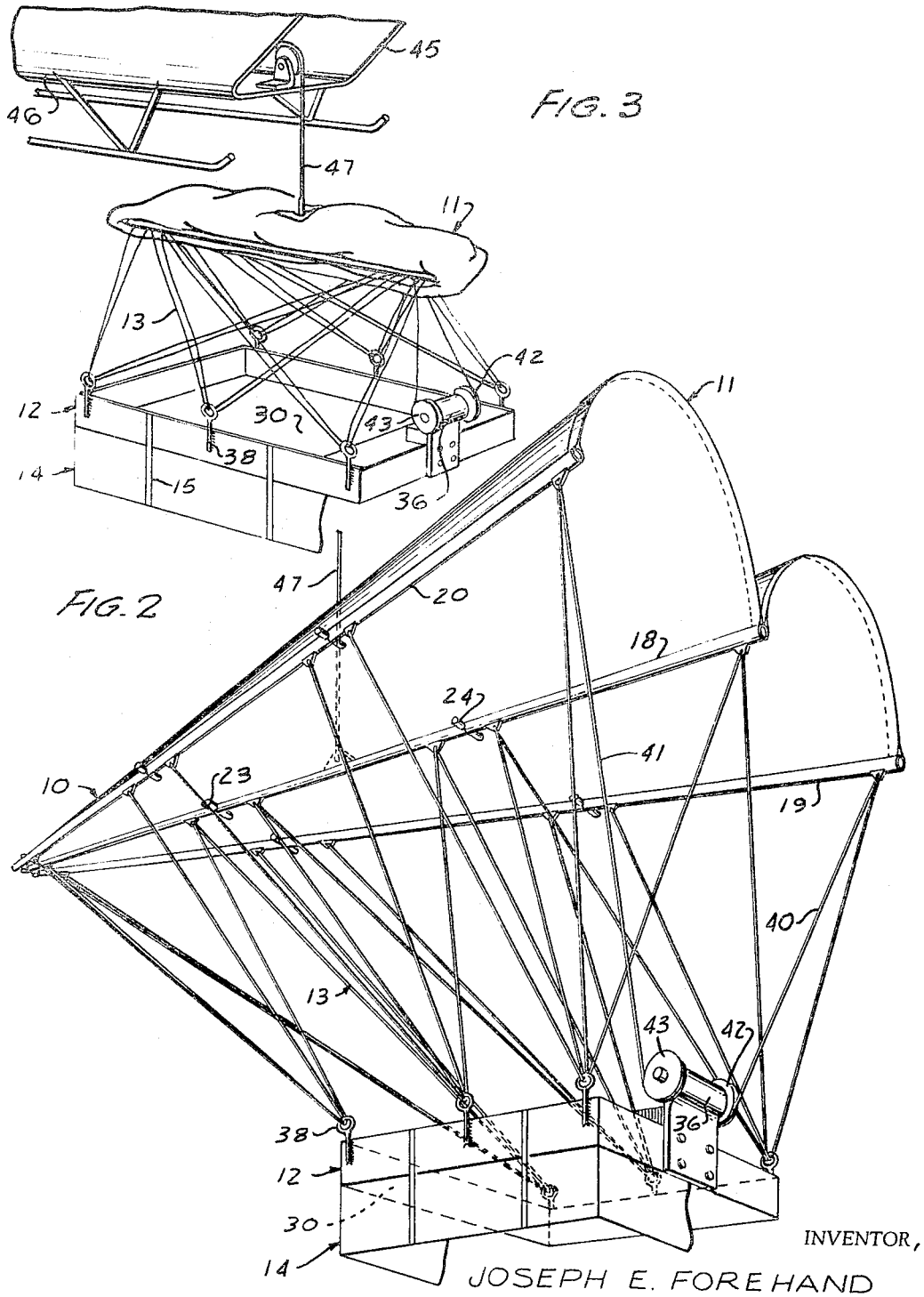

United States Patent Office 3,356,316
Patented Dec. 5, 1967

3,356,316
HINGED SPAR FLEXIBLE WING GLIDER
Joseph E. Forehand, Newport News, Va., assignor to the United States of America as represented by the Secretary of the Army
Filed Oct. 15, 1965, Ser. No. 496,726
1 Claim. (Cl. 244—43)

ABSTRACT OF THE DISCLOSURE

An apparatus for collapsing the wing of a glider and for causing the wing to turn in flight where the frame of the wing is sectional and a winch and sheet arrangement which permits one rear corner of the wing to raise while simultaneously lowering the other rear corner.

---

The invention disclosed herein may be manufactured and used by or for the Government for governmental purposes without payment to me of any royalty thereon.

This invention relates to flexible wing gliders and more particularly to a foldable glider having jointed spars.

It is among the objects of the invention to provide an improved cargo carrying drop glider which can be foldglider, when in folded condition, can be carried in a cargo carrying aircraft and which will automatically unfold and assume a flight condition when deployed from the carrying aircraft.

A further object resides in the provision of a foldable, flexible wing glider of the character indicated, having substantially rigid spars each provided with a plurality of hinged joints spaced apart along the length thereof whereby the glider can be folded to a length that is only a fraction of its unfolded length.

A still further object resides in the provision of a foldable, flexible wing glider having substantially rigid spars hinged together at the front end of the glider and provided with hinge joints spaced apart along the length thereof so that the glider can be easily folded and unfolded.

An additional object resides in the provision of a rigid spar drop glider of effective cargo carrying size which can be readily carried in and deployed from a cargo type aircraft.

Other objects and advantages will become apparent from a consideration of the following description and the appended claims in conjunction with the accompanying drawings wherein:

FIG. 1 is a plan view of the glider frame showing the hinge connected and jointed spars;
FIG. 2 is a perspective view of the glider in flight;
FIG. 3 is a perspective view of the glider in folded condition immediately after being deployed from a cargo aircraft; and,
FIG. 4 is a perspective view of the glider in partly unfolded condition.

With continued reference to the drawings, the glider has a frame 10, a flexible wing or diaphragm 11, and a control platform 12 suspended from the frame by a system of shroud lines 13. A cargo package 14 is shown attached to the platform by suitable means, such as the straps 15.

As shown in FIG. 1 the frame is of triangular shape when extended, and comprises a keel 18 and two leading edge spars 19 and 20. At the front or apex end of the frame spar 19 is connected to keel 18 by a vertical axis hinge 21 and spar 20 is connected to keel 18 by a similar hinge 22. These hinges permit the leading edge spars to converge to positions alongside the keel and to diverge to the triangular form of the frame shown in FIG. 1.

The keel 18 and the two leading edge spars 19 and 20 are each divided into three sections of substantially equal length and adjoining sections are connected together by horizontal axis hinges as indicated at 23 and 24 for the keel, 25 and 26 for spar 19, and 27 and 28 for the spar 20. These hinges permit the frame members to fold so that the end portions of the frame members can be brought under the center portions in substantially coterminous relationship thereto, as indicated in FIG. 3. It is contemplated that the frame members will be of high strength, resilient and light weight material such as metal or glass fiber reinforced plastic tubing.

The diaphragm 11 is a triangular sheet of high strength, substantially air impervious material and is suitably reinforced along its edges as by hemming. The diaphragm is continuously secured along its edges to the spars 19 and 20 and along its longitudinal center line to the keel 18 and is of sufficient area that it assumes the shape of two side by side semiconical portions when the glider is in flight, as shown in FIG. 2.

The platform 12 is a rectangular tray having a length substantially equal to the length of the center portions of the frame members and a width somewhat less than its length. It has a flat bottom 30, end walls 31 and 32 and side walls 33 and 34. A compartment 35 is provided interiorly of the platform at one end thereof for the reception of radio homing equipment and a servo motor operated winch 36 is mounted on the compartment 35. Eye straps or chain plates 38 are secured to the sidewalls 33 and 34 of the platform at locations spaced apart along the side walls and the lower ends of the shroud lines 13 are secured to these eye straps. Sheets 40 and 41 are connected to the rearward ends of the spars 19 and 20 respectively and are wound on the corresponding sheaves 42 and 43 of the winch 36 in such a manner that when one sheet is taken in the other is let out depending on the direction of rotation of the winch motor. Pulling down on one rear corner of the wing while permitting the other rear corner to rise causes the wing to turn in flight so that the glider will automatically steer a homing course to a fixed radio transmitter or will respond to command signals from a transmitter.

As stated above, the cargo package 14 is positioned directly below the platform 12 and may be secured to the platform by suitable straps 15. The cargo package may, however, be any of various shapes and sizes and may be provided with landing wheels or skids if desired. The particular frame construction hereinabove described is not limited to any glider size or use so long as the glider, when in folded condition, can be carried in a suitable aircraft.

In order to conveniently store the glider in the carrying aircraft, the wing is folded by bringing the leading edge spars alongside the keel and then folding the frame members at the joints thereof until the end portions underlie and are substantially coextensive with the intermediate portions, care being taken to make sure that the diaphragm is kept clear and on the outside of the frame. The shroud lines and sheets are then carefully folded into the tray provided by the control platform and the folded wing placed on the lines. For convenience the wing should then be secured in place on the platform by an easily releasable tie. The cargo packages may be secured to the gliders before the gliders are loaded into the carrying aircraft or the gliders and cargo packages may be loaded separately and united in the aircraft just before deployment, as may be most convenient.

When a loaded glider is deployed from a carrying aircraft it is moved out of the cargo door 45 of the aircraft 46 with the wing folded on the control platform, as shown in FIG. 3. A static line 47 depending from the aircraft, is connected at its lower end to the keel 18 adjacent to the mid-length locations of the center section of the keel. As the loaded glider falls away from the aircraft the static line pulls the folded wing up from the control platform and the wing then starts to unfold, as shown in FIG. 4. As the glider is now dropping the air rushes upwardly relative to the glider and into the partly unfolded diaphragm. This creates a sufficient air pressure on the underside of the diaphragm to complete the unfolding of the wing. As the wing unfolds the shroud lines 13 become taut and pull the frame members of the wing to the proper shape and position to frame the expanded wing, as shown in FIG. 2. The shroud lines will then maintain the frame members substantially straight and the shroud lines and diaphragm will maintain the proper spread of the spars relative to the keel.

It is contemplated that the glider will be reused for a number of air deliveries and can be refolded after each flight.

While a particular mechanical embodiment has been hereinabove described and illustrated in the accompanying drawings, it is to be understood that the scope of the invention is not limited to the embodiment so illustrated and described but is commensurate with the scope of the appended claim.

I claim:

In a flexible wing glider having a frame comprising a multi-sectional keel member and two multi-sectional leading edge spar members disposed one at each side of said keel member and hingedly connected thereto at the front end of said frame whereby said spar members may diverge rearwardly to provide opposing rear wing corners, a diaphragm comprising a triangular sheet of flexible material secured to said frame, hinge means securing the sections of said keel member and of said leading edge spar members together, a platform, means securing said diaphragm to said platform, a winch mounted on said platform, a sheet connected to one of said rear wing corners and wound on said winch, a second sheet connected to the opposite rear wing corner and wound on said winch in a direction opposite to that of said first mentioned sheet whereby one sheet is taken in and the other sheet is let out as the winch is turned permitting one rear corner to be raised and the other rear corner to be lowered thereby causing the wing to turn in flight.

References Cited

UNITED STATES PATENTS 3,198,458  8/1965  Fink _____ 244—49

OTHER REFERENCES

Hewes, D. E.: NASA Technical Note D-927, Free-Flight Investigation of Radio Controlled Models With Parawings, September 1961, pp. 5–6.

FERGUS S. MIDDLETON, *Primary Examiner.*

MILTON BUCHLER, *Examiner.*

R. A. DORNON, *Assistant Examiner.*